(12) United States Patent
Schumacher et al.

(10) Patent No.: US 10,869,175 B2
(45) Date of Patent: Dec. 15, 2020

(54) SYSTEM AND METHOD FOR GENERATING A THREE-DIMENSIONAL MODEL USING FLOWABLE PROBES

(71) Applicants: Nathan Schumacher, Madison, WI (US); Vince Anewenter, Port Washington, WI (US); Thomas Mackie, Verona, WI (US); Jiju George Johnson, Milwaukee, WI (US)

(72) Inventors: Nathan Schumacher, Madison, WI (US); Vince Anewenter, Port Washington, WI (US); Thomas Mackie, Verona, WI (US); Jiju George Johnson, Milwaukee, WI (US)

( * ) Notice: Subject to any disclaimer, the term of this patent is extended or adjusted under 35 U.S.C. 154(b) by 699 days.

(21) Appl. No.: 14/932,189

(22) Filed: Nov. 4, 2015

(65) Prior Publication Data

US 2016/0125101 A1 May 5, 2016

Related U.S. Application Data

(60) Provisional application No. 62/075,045, filed on Nov. 4, 2014.

(51) Int. Cl.
*H04W 4/80* (2018.01)
(52) U.S. Cl.
CPC .................................... *H04W 4/80* (2018.02)
(58) Field of Classification Search
CPC ........................................................ H04W 4/80
USPC ............................................................. 703/6
See application file for complete search history.

(56) References Cited

U.S. PATENT DOCUMENTS

| | | | |
|---|---|---|---|
| 5,988,862 A | 11/1999 | Kacyra et al. | |
| 7,510,123 B2 * | 3/2009 | Overhultz | A47F 10/00 |
| | | | 235/380 |
| 7,990,397 B2 | 8/2011 | Bukowski et al. | |
| 8,104,189 B2 | 1/2012 | Tait | |
| 8,260,037 B2 | 9/2012 | Lin et al. | |
| 8,294,906 B2 | 10/2012 | Siercks et al. | |
| 8,332,173 B2 | 12/2012 | Ishikawa | |
| RE43,965 E | 1/2013 | Crampton | |
| 8,365,426 B2 | 2/2013 | Ruck | |
| 8,396,293 B1 | 3/2013 | Korah et al. | |
| 2008/0316324 A1 * | 12/2008 | Rofougaran | A63F 13/235 |
| | | | 348/222.1 |
| 2012/0052967 A1 * | 3/2012 | Grieshaber | A63B 37/0003 |
| | | | 473/155 |
| 2013/0201003 A1 * | 8/2013 | Sabesan | G01S 7/42 |
| | | | 340/10.1 |

OTHER PUBLICATIONS

Hinske, Steve. "Determining the position and orientation of multi-tagged objects using RFID technology." Pervasive Computing and Communications Workshops, 2007. PerCom Workshops' 07. Fifth Annual IEEE International Conference on. IEEE, 2007. pp. 1-5.*

(Continued)

*Primary Examiner* — Kamini S Shah
*Assistant Examiner* — John E Johansen
(74) *Attorney, Agent, or Firm* — Boyle Fredrickson, S.C.

(57) ABSTRACT

Digitization of a 3-D object is provided by surrounding the object with flowable probes whose positions may be accurately determined. By identifying at least those flowable probes adjacent to the outer surface of the object, a locus of points on the outer surface of the object may be determined from which the object shape may be defined in a model.

14 Claims, 2 Drawing Sheets

(56) References Cited

OTHER PUBLICATIONS

Sugiura, Yuta, et al. "Detecting shape deformation of soft objects using directional photoreflectivity measurement." Proceedings of the 24th annual ACM symposium on User interface software and technology. ACM, 2011. pp. 509-516. (Year: 2011).*

* cited by examiner

SYSTEM AND METHOD FOR GENERATING A THREE-DIMENSIONAL MODEL USING FLOWABLE PROBES

CROSS REFERENCE TO RELATED APPLICATION

This application claims the benefit of U.S. provisional application 62/075,045 filed Nov. 4, 2014, and hereby incorporated by reference.

STATEMENT REGARDING FEDERALLY SPONSORED RESEARCH OR DEVELOPMENT

—

BACKGROUND OF THE INVENTION

The present invention relates to a system for generating a three-dimensional (3D) model of an object and in particular to a system making measurements by surface contact such as may better reveal surface characteristics and make measurements in hollow volumes and undercuts and the like.

Generating a mathematical model of a three-dimensional object by making multiple measurements of the object's surface can be important for inspection (for example, inspecting manufactured goods for defects and the like), manufacturing (for example, controlling a three-dimensional printer or machine tool to manufacture the object), and graphic arts (where the model is used, for example, as a reference for animation or the like).

This technique of generating models, often called digitization, yields a model, in the form of a data file consisting of points, for example, defined in Cartesian three space, coincident with the outer surface of the object and samples intervals over that surface sufficient so that the object shape can be closely approximated by the samples.

Conventional techniques for generating such models may make use of optical scanning, for example, using triangulation from stereo cameras of a pattern projected on the object or other range finding techniques, as well as methods such as computed tomography and laser range finding. High accuracy models are normally generated by the use of a probe that moves over the surface of the object, touching it at regular intervals to determine the location of its surface. This latter technique is slow requiring sequential movement of the probe between each measurement. Aside from computed Tomography (CT can image undercuts but has its MR limitations e.g. metal parts), none of these techniques operate well when the surface of the model has undercuts or cavities.

SUMMARY OF THE INVENTION

The present invention provides a high-speed contact-type system for generating models of an object using a parallel process operating through multiple "flowable" probes that surround and contact the object. For example, the flowable probes may be spherical beads poured into a container holding the object. A localization circuit identifies the location of the probes that are in contact with the outer surface of the object to derive a set of points that define the object's outer surface. The flowable probes may flow into cavities and undercuts to provide a more comprehensive understanding of the outer surface of the object and may be used with objects that would otherwise be difficult to scan, for example, metal objects having specular reflections.

Specifically, in one embodiment, the present invention provides a system for generating a model of an object having a plurality of flowable probes independently flowable into contact with an outer surface of the object and a flowable probe localization circuit identifying the location of the flowable probes in contact with the outer surface of the object to derive a set of location points on the outer surface of the object to output a model describing the outer surface of the object.

It is thus a feature of at least one embodiment of the invention to provide a versatile digitizing system capable of high-speed multipoint contact measurements through the use of multiple probes.

The system may further include a container to receive the object and to constrain the plurality of flowable probes within a volume of the container so that some of the flowable probes press against the outer surface of the object under the pressure of other flowable probes.

It is thus a feature of at least one embodiment of the invention to provide a simple method of urging multiple probes into contact with the outer surface of an object through a Pascallian pressure generated by flowable probes.

Each plurality of flowable probes may provide a substantially spherical outer surface.

It is thus a feature of at least one embodiment of the invention to provide a shape that is both readily flowable and symmetric so that a contact point with the object can be readily deduced from the shape location.

Each of the plurality of flowable probes may output a periodic radio signal and the flowable probe localization circuit may provide antennas for receipt of the periodic radio signal to locate the position of the flowable probe from the periodic radio signal.

It is thus a feature of at least one embodiment of the invention to provide a simple method of localization that allows the probes to be untethered.

The location may be based on a deduced distance between the antennas and a given probe determined from at least one of amplitude and phase of the radio signal.

It is thus a feature of at least one embodiment of the invention to provide a flexible method of locating the probes using a known propagation speed of radio signals.

The periodic radio signal may encode an identifier allowing the flowable probe to be distinguished from other flowable probes.

It is thus a feature of at least one embodiment of the invention to permit discrimination among the signals between various probes for parallel data acquisition.

The flowable probes may scavenge electrical energy from a wireless signal to transmit the periodic radio signal.

It is thus a feature of at least one embodiment of the invention to eliminate the need for batteries or the like in the probes.

The flowable probes may include contact sensors for identifying whether the flowable probe is in contact with the object to provide a signal indicating that contacting.

It is thus a feature of at least one embodiment of the invention to greatly decrease the number of probe positions that need to be determined by identifying contacting probes independent of the determination of their location These particular objects and advantages may apply to only some embodiments falling within the claims and thus do not define the scope of the invention.

DETAILED DESCRIPTION OF THE PREFERRED EMBODIMENT

Figure 1:
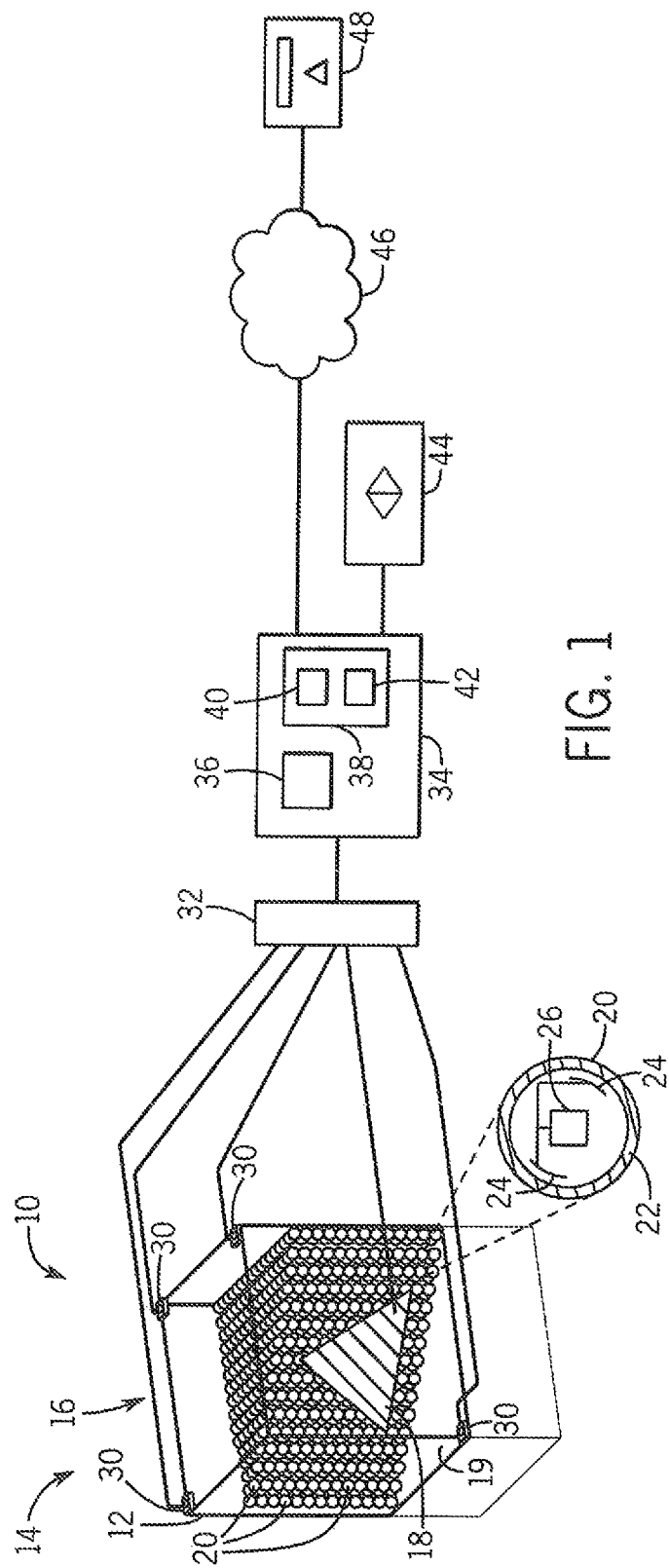
FIG. 1 is a block diagram showing the principal elements of one embodiment of the present invention including a container into which flowable probes may be poured to surround an object (shown in cross-section) to be identified using multiple antennas connected to a radio transceiver and computer system and FIG. 2 is a flowchart of steps in using the embodiment of FIG. 1 including those executed by a program on the computer.

Referring now to FIG. 1, a digitizing system 10 of the present invention may provide for a container 12, for example, in the form of a rectangular box open at an upper surface 14 and closed at a lower bottom surface 19 to define an internal volume 16. An object 18 to be digitized, for example, a triangular pyramid in the example shown, may be positioned within the volume 16 preferably supported away from the bottom surface 19 by a pedestal or the like (not shown). A set of flowable probes 20 may be introduced into the volume 16 to flow about all of the surfaces of the object 18 (except for the location of the pillar) so that an inner layer of flowable probes 20 contacts the outer surfaces of the object 18 at contact points which define the outer surface of the object 18 at regular but not necessarily evenly spaced intervals.

The flowable probes 20, for example, may be spherical to improve their flowability but other shapes may also be used. Generally the size of the flowable probes 20 will define the sampling interval of points on the object 18 with the use of a smaller size of flowable probes 20 providing a higher sampling density. Generally, the flowable probes 20 need not pack in a regular fashion as depicted and the flowable probes 20 need not be of the same size as would facilitate regular packing. It will be appreciated that the container 12, in some embodiments of the invention, may be partially filled with spacer elements to reduce the number of flowable probes 20 necessary to ensure contact between flowable probes 20 and the outer surfaces of the object 18. Alternatively different container sizes may be used.

Referring still to FIG. 1, each active flowable probe 20 may provide, for example, an outer insulating shell 22 of thermoplastic material supporting in a hollow interior one or more antennas 24 communicating with an internal radio transceiver 26. Radio transceiver 26 may make use of so-called RFID tag technology, scavenging electrical power from received radio signals from antennas 24 to power the transceiver 26 which may then use that power to output an encoded radio signal. The power may be stored in an internal capacitor. Alternatively batteries may provide power to the radio transceiver 26

In the present embodiment, the encoded radio signal may include an identification number that helps uniquely identify the given flowable probe 20. The size and frequency response of the antennas 24 and/or the reception and transmission frequency of the transceiver 26 and the frequency of operation of the radio transceiver 26 may be varied among the flowable probes 20 so as to permit a limited set of flowable probes 20 to be interrogated at any given time for the purpose of improving radio transmission intelligibility. Changing the frequency response band of the antennas 24 also minimizes absorption of transmitted radio frequencies through the flowable probes 20 by other flowable probes 20.

In one embodiment the radio transceiver 26 for each flowable probe 20 may delay transmission of the encoded radio signal by a random interval so as to reduce interference with other flowable probes 20. Alternatively, the interrogating signal may identify one or a subset of the flowable probes 20 for response (for example, through a control data packet in the radio signal received by the flowable probes 20) and only those flowable probes 20 programmed to respond to that control data packet may respond. In this way interference may also be reduced.

In at least one embodiment, only the flowable probes 20 adjacent to the object 18 are critical for measurement and accordingly some other flowable probes 20 may be "dummy" elements or larger irregular spacer elements to reduce the number of active flowable probes 20.

A set of radio antennas 30 may be located at known locations on or with respect to the container 12 dispersed among three dimensions. For example, a different radio antenna 30 may be placed in at least four corners of the container 12, the latter of which may be constructed, for example, of a thermoplastic material allowing free passage of radio signals to the radio antennas 30.

Each of the antennas 30 may be connected to a central radio transceiver 32 which may operate to apply a radio signal energy to the flowable probes 20 (providing them transmission power and signals as to whether they should transmit) and then to wait to receive corresponding transmissions from the individual flowable probes 20. Received radio energy signals from the flowable probes 20 may then be decoded to identify an identity of each flowable probe 20 and characterize the signals received by each antenna 30 with respect to received signal strength (RSS) and/or signal phase for that identified flowable probe 20. Signal time delay difference may also be characterized for each flowable probe 20 being the time difference between the arrival of a given signal from a given flowable probe 20 at each antenna 30.

This information extracted from the received signals may be processed by an electronic computer 34 having a processor 36 communicating with a memory 38 holding a stored program 40, as will be described, and constructed models 42 of objects 18. These models may be displayed, for example, on a display 44 or transmitted over a network 46 to other individuals including, for example, fabricators having three-dimensional printing machines 48. In this example, the three-dimensional printing, machine 48 may then be used to print a copy or facsimile of the object 18.

Figure 2:
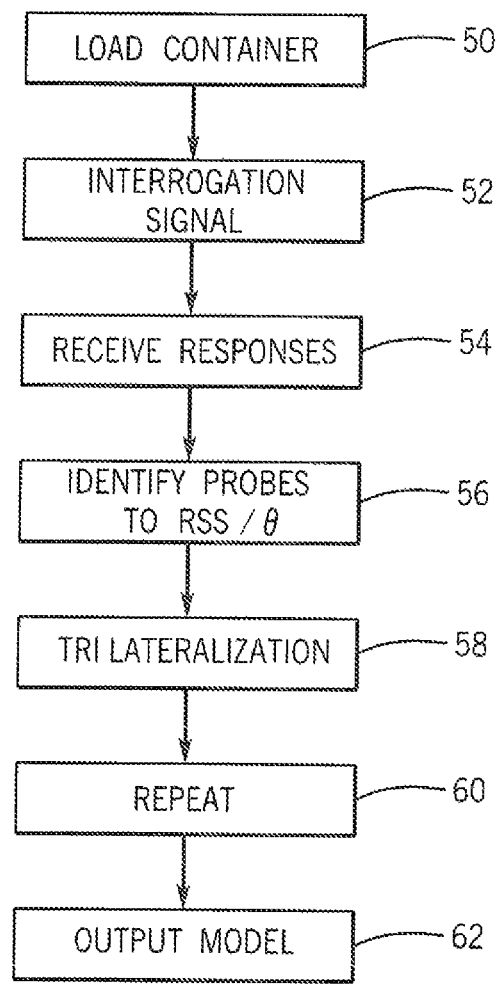

Referring now also to FIG. 2, the process of digitizing the object 18 begins as discussed above with placing the object 18 within the container 12 positioned to allow flowable probes 20 to flow about it on all sides of interest and with the introduction of a sufficient number of flowable probes 20 to cover the exposed surfaces of the object 18. This step is indicated by process block 50.

The term "flowable elements" refers to elements that will naturally arrange themselves to a position of low potential energy and high density without substantial internal voids or the like in the manner of water or fine sand and require simply that the weight and size of the flowable probes 20 be such that they will slide over each other to move into a compacted form under the force of gravity either with or without agitation. Flowability will permit some the flowable probes 20 to help press other flowable probes 20 against all exposed outer surfaces of the object 18 in the manner of a constrained fluid subject to Pascal's law.

As indicated by process block 52, at a next step, the transceiver 32 applies an interrogating signal to the antennas 33 received by the flowable probes 20 to provide them with scavenged power. This interrogating signal may include encoded data instructing only a selected subset of the flowable probes 20 to respond, that subset being those flowable probes 20, for example, matching a range into which a value of the encoded data instruction falls.

At process block 54, any reply signals from the flowable probes 20 are detected by the antennas 30 as indicated by process block 54. In this detection process, each signal from each different antenna 30 is separately processed with respect to identifying the signals from each flowable probe 20. The particular signal from each flowable probe 20 is identified by a unique or rarely repeating series of numbers encoded in the signal. For each identified signal, physical parameters of the signal are measured including the signal strength of the receive signal and the phase or time delay of the signal. Ideally only a single or relatively few flowable probes 20 will respond at the same time to simplify the discrimination of the signal characteristics from each flowable probe 20; however, as will be explained, multiple simultaneous transmissions may also be accommodated by frequency division multiplexing.

As indicated by process block 56, the identified signal strength and/or phase linked to a given flowable probe 20 (by its identification code) for multiple antennas 30 are then transmitted to the computer 34 which controls the transceiver 32.

At process block 58, this information from process block 56 is used to "trilateralize" each of the transmitting flowable probes 20. Trilateralation as used herein is not intended to be limited to a particular mathematical technique for localizing a flowable probe 20 but refers generally to any technique of using known distances to each flowable probe 20 from each antenna 30 used to identify a unique location for the flowable probe 20. It will be appreciated that one version of this process solves simultaneously for the intersection of spheres centered around each antenna 30 of different radii determined by the signal strength or phase or time delay of the received signal by that antenna for a particular flowable probe 20. This intersection defines the location of the flowable probe 20 in three dimensions. Minor mismatch in this process can be accommodated by finding multiple intersections within an arbitrary error zone and averaging those intersection locations. Conflict in the transmissions by multiple flowable probes 20 can be resolved by clustering possible flowable probe locations determined by trilateralization to discard the outliers.

At process block 58, the flowable probes 20, adjacent to a void in the flowable probes 20 within the walls of the container 12, identify those flowable probes contacting the object 18 and/or the container extents. The location of these flowable probes 20 define the outer surface of the object 18 which is used to produce a model 42 that may be output per process block 62. For example, points on the outer surface of the object 18 may be set to be equal to the intersection of a locus of points defining the outer surface of the flowable probe 20 and a vector pointing from the center of the flowable probe 20 toward the center of the void. Alternatively, least square or other fits between single points defining the outer surface of the flowable probes 20 and planar surfaces may be used when the object 18 may be defined as a set of planes.

At process block 60, process box 52, 54, 56, and 58 may be repeated to obtain additional data for averaging and noise reduction or to acquire data from different subsets of the flowable probes 20.

The above embodiment provides for the identification of many flowable probes 20 some of which are not in contact with the object 18. This additional data collection burden can be reduced, for example, by providing a connection between the object 18 and the transceiver 32 to provide a low level of interrogation signal localized to the object 18, for example, through a conductive skin of the object 18. In this way only flowable probes 20 near the object 18 are activated for transmission. Alternatively the signal on the object 18 may be a secondary near field signal augmenting a signal transmitted from the antennas 30, the secondary near field signal being detectable only by those flowable probes 20 adjacent to the object 18. This near field signal provides only flowable probes 20 next to the object 18 with the permission to transmit data. Also the response from the probes in contact may then have a unique signal from the rest of the non contact probes (basically instead of granting permission, in a case where all probes are transmitting, because of the augmented signal those in contact are more easily identified)

Generally the container 12 can be of any size or shape sufficient to contain the object 18 and to allow one or more layers of flowable probes 20 to surround that object 18. In certain embodiments, when the object 18 to be scanned is of a large size, the container 12 may, for example, comprise a large room defining a scanning volume 16 into which the object 18 and flowable probes 20 are inserted. In one embodiment, the flowable probes 20 may be in constant motion, for example, in a vibrating chamber 12 or projected, for example, by an air gun, against the object 18 to report their position only upon contacting the object 18, for example, determined by the transmission through the object 18 discussed above or by means of an internal accelerometer detecting an impact or by a rapid tracing of their position and detecting a change in trajectory.

Because each individual flowable probe 20 is autonomous and not tethered to any other individual flowable probe 20, the movement of the flowable probes 20 is unconstrained within the housing scanning volume 16. Thus, once the plurality of flowable probes 20 is poured into the housing scanning volume 16, the flowable probes 20 are free to flow under the influence of gravity so as to conform to the shape of and fully submerge the object 18. Not only do the freely flowable probes 20 adapt to entirely envelop the outer surface and geometry of the object 18, but the plurality of flowable probes 20 is also adapted to flow into and entirely surround and conform to the inner surfaces and geometries of any holes, interiors, or other voids or cavities in the object 18.

To ensure that the flowable probes 20 are able to adapt to and entirely fill in any holes, interiors, or any other voids or cavities in the object 18, the container 12 may be shaken, vibrated, tapped, or otherwise agitated one or more times to aid in the movement of the flowable probes 20 as they are filling up the voids and cavities of the object 18.

The flowable probes 20 generally comprise a known size and shape. Although in a preferred embodiment the flowable probes 20 comprise a spherical shape and have a radius of between approximately 0.5 mm or less and approximately 10 mm or more, the shape and size of the flowable probes 20 can be varied depending on the object 18 to be scanned and/or the desired resolution of the generated 3D model. For example, for larger object 18 or object 18 having planar surface geometries, larger sized flowable probes 20 may be used to generate sufficiently high resolution models. For smaller objects, or objects having non-planar surface geometries, the use of smaller sized flowable probes 20 will, generate high resolution 3D models. In general, the smaller the dimension of the flowable probes 20 used, the higher the resolution the generated 3D model will be. Thus, based on the size and surface geometry of the object to be scanned, different shaped and different sized flowable probes 20 can be used to obtain a 3D model having the desired resolution.

Once the object 18 is placed into the housing scanning volume 16 and the plurality of flowable probes 20 is poured over the object 18 such that object 18 is entirely submerged and both the outer and any inner surfaces of the object. 18 are entirely surrounded by and in direct contact with the flowable probes 20, the digitizing system 10 is activated and information related to the position of the flowable probes 20 within the housing scanning volume 16 is relayed from the transceiver 32 to the computer 34 which together provide flowable probe localization circuitry. The computer 34 generates a 3D model of the object 18.

The computer 34 may interpolate and/or extrapolate positional information from each flowable probes 20 to render a 3D image of the scanning volume 16 on display 44. This 3D image may form a positive or negative 3D outline of the scanned object 18.

In yet a further embodiment, individualized flowable probe 20 positions can be determined using a daisy-chain method. In such an embodiment, the flowable probes 20 receive precise time signals from the antennas 30 and determine their own locations from variations in those times in the matter, for example, of a GPS or Loran receiver. The flowable probe 20 may then relay this information either by direct radio transmission or from sensor to sensor in a daisy chain fashion to the outer sensors which may include sensors wired to the transceiver 32 or communicating wirelessly.

In one embodiment, the individual flowable probes 20 may determine their location by detecting and identifying adjacent flowable probes 20. This process may be continued outward from the object 18 until it arrives at fiducial flowable probes 20 of known position which may then be used to determine the position of all contacting flowable probes 20 based on the knowledge of their relative offsets determined from a tree of contacting flowable probes 20. For example, the sensor nodes may be electrically conductive, and information may be passed between neighboring flowable probes 20 though electrically conductive contact between the sensor nodes of neighboring flowable probes 20. In the daisy chain embodiment, once the flowable probe 20 has detected and identified what other flowable probes 20 are surrounding it, the flowable probe 20 transmits this information to the transceiver 32 and then to the computer 34.

In one embodiment, such selective relay of positional information may be accomplished by programming the flowable probes 20 to not transmit positional information to the transceiver 32 if a flowable probe 20 detects that it is entirely surrounded by other flowable probes 20. However, if the flowable probe 20 detects that it is not entirely surrounded by other flowable probes 20, the flowable probe 20 is programmed to transmit its positional information to the antenna 30. Normally, those flowable probes 20 that are adjacent to the wall of the container 12 will also detect that they are not entirely surrounded by other flowable probes 20. However, to avoid the positional information of those flowable probes 20 adjacent to the container 12 wall from being used in generating a model of the object 18, the computer 34 can be programmed to ignore data from these flowable probes 20.

In another embodiment employing the selective relay of positional information, the flowable probes 20 can be designed to detect who their neighbors are through the use of optical sensor technology. In such an embodiment, the flowable probes 20 are made of a clear or transparent material, such as, for example, silicone, acrylic, polycarbonate, glass, cyclic olefin copolymer, etc., and each flowable probe 20 comprises an optical sensor and/or camera.

Additionally, the flowable probes 20 may be internally illuminated by means of an LED or the like or be coated with a given color, such that the flowable probe 20 is capable of being detected by the optical sensor of a neighboring flowable probe 20. Where a flowable probe 20 is entirely surrounded by other sensor modules and is not in visual contact with the object 18, the amount of light reaching and detected by the optical sensors will be relatively high, as the clear/transparent nature of the flowable probes 20 will let light pass through the flowable probes 20. On the other hand, the amount of light reaching and detected by the optical sensors of those flowable probes 20 that are in visual contact with the object will be relatively low, as the object will block a portion of the flowable probe 20, and thus prevent the amount of light that can pass through and be detected by the optical sensor. The amount of light detected by the optical sensor and/or camera is then transmitted to a sensor module transceiver, which is capable of relaying this information to the transceiver 32 and computer 34. Here the optical sensors are cameras that may be positioned in the same locations as the antennas 30.

In a process similar to that of previously described embodiments, the flowable probes 20 of such an optical sensor embodiment can be programmed to only relay positional information if the amount of light detected by the flowable probe 20 falls below a designated threshold value signifying that the sensor module is in visual contact with the object 18. Alternatively/additionally, the flowable probes 20 can also be programmed to transmit positional information in situations 11 when the optical sensor detects a color other than the color of the flowable probes 20. By nullifying and not relaying the positional information of flowable probes 20 that are not in visual contact with the object 18, the number of signals transmitted to the computer 34 is decreased, which reduces the computation required of the computer 34 to determine the geometry of the object 18. In embodiments using flowable probes 20 that transmit positional information to the antennas 30 and transceiver 32, it is possible to use a mix of sensor modules containing both smart and dummy flowable probes 20. Smart flowable probes 20 are those flowable probes 20 that contain the necessary sensor technology to generate and transmit positional information to the transceiver 32. Dummy flowable probes 20 are those flowable probes 20 that have the same size, shape, and weight as smart flowable probes 20 but do not contain sensor technology to generate and transmit positional information.

Embodiments using smart/dummy flowable probes 20 generate 3D models that may create data sets having missing portions where a dummy flowable probe 20 is adjacent to the object 18. In order to generate a more accurate 3D model in which there are no (or minimal) unmapped portions of the object, the positions of flowable probes 20 need to be reset to new positions. This resetting of positions of the flowable probes 20 can be achieved by stirring or otherwise agitating the flowable probes 20 directly. Alternatively, the flowable probes 20 can be reset indirectly by shaking, vibrating, or otherwise agitating the container 12 so as to displace the flowable probes 20 to new positions. Once the positions of the mixed smart and dummy flowable probes 20 have been reset, a new scan of the object 18 is acquired. Generally, the more the flowable probes 20 are reset and reimaged, the higher the resolution of the final generated 3D model of the object 18.

When radio signals received at the antennas 30 are used to locate the flowable probes, the computer 34 may use trilateration, received signal strength, time of flight (round nip), time-difference of arrival (DOA), triangulation based on DOA, and/or phase difference of arrival to determine the position of the flowable probes 20.

The components of the flowable probe 20 may be housed together by potting or casting the components together in non-metallic materials that readily allow RFID, Bluetooth or other wireless signals to propagate through the flowable probes 20 and on to the antennas 30, transceiver 32, and/or computer 34. Such materials include, but are not limited to silicone, urethane, and plastics (e.g., acrylic, polycarbonate, etc.). Alternatively, the flowable probe 20 may be constructed such that the components are each supported within a hollow sensor module housing. Such a hollow sensor module housing may, for example, take the form of a plastic shell created through injection molding, wherein the shell comprises two halves that fasten together to form a sphere.

In embodiments such as those described above, in which the flowable probes 20 actively transmit positional information, the flowable probes 20 can be powered by a battery (such as, e.g., a lithium ion battery), and/or by power received electromagnetically, or via radiofrequency. Generally, the flowable probes 20 may require low power, requiring approximately 100 mW or less.

Alternatively, in some embodiments the flowable probes 20 may receive electrical signals passed between neighboring flowable probes 20. In yet another embodiment, the flowable probes 20 can be charged electrochemically. In such an embodiment, the housing scanning volume 16 is filled with an electrolytic solution capable of charging the flowable probes 20. The flowable probes 20—which are either heavier than the electrolytic solution or are constructed so as to have the same buoyancy as the electrolytic solution—are then placed, along with the object 18 to be scanned, into the housing scanning volume 16.

In a different embodiment of the digitizing system 10, a 3D model of an object 18 can be acquired by passive measurement. In this case, the flowable probes 20 are constructed so as to have a known resistance. The flowable probes 20 may, for example, be constructed of a carbon composite material or a metal oxide material, and are preferably constructed to have a known resistance of approximately 1-1000 or more ohms. Once the object 18 has been submerged into flowable probes 20 contained in the volume 16, a current is passed through the housing scanning volume 16. The change in voltage is then measured along each of the axes of any one of or any combination of, Cartesian, cylindrical, spherical, or any other coordinate system. The changes in voltage are then analyzed by the computer 34, and a resulting 3D model is generated. Such an embodiment can be used to generate 3D models of either electrically conductive or electrically non-conductive objects 18.

When scanning electrically conductive objects 18, the change in potential measured across sections of the housing scanning volume 16 in which the electrically conductive object 18 is present will be smaller than in sections in which the object 18 is not present. On the other hand, when scanning non-conductive object 18, the change in potential measured across sections of the housing scanning volume 16 in which the object 18 is present will be greater than in sections in which the object 18 is not present.

Of course, it is to be understood that the above-described embodiments and arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the 15 most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A system for generating a model of an object comprising:
   a plurality of flowable probes having a spherical outer surface adapted to be independently flowable into contact with a face of the object and so that they may slide over each other to move into a compacted form under the force of gravity, each of the plurality of flowable probes including a transmitter; and
   a flowable probe localization circuit having a receiver for receiving transmitted information from the transmitters of the plurality of flowable probes and identifying a plurality of locations, each associated individually with each of the flowable probes in contact with the outer surface of the object, to derive a set of location points on the outer surface of the object, the location points defined by a contact between the spherical outer surface of the probes and the outer surface of the object, to generate and output a model describing the outer surface of the object;
   a container to receive the object and to constrain the plurality of flowable probes within a volume of the container so that a plurality of the flowable probes press against the outer surface of the object under a pressure of other flowable probes to define the location points;
   wherein the flowable probe localization circuit provides antennas for receipt of signals from the flowable probes to identify the locations of the flowable probe from the signals;
   wherein the identification of the locations is based on tri-lateralization using at least one of amplitude and phase of a radio signal received or transmitted from the flowable probe.

2. The system of claim 1 wherein each of the plurality of flowable probes outputs a periodic radio signal and wherein the flowable probe localization circuit provides antennas for receipt of the periodic radio signal to identify the locations of the flowable probe from the periodic radio signal.

3. The system of claim 2 wherein the identification of the locations is based on at least one of amplitude and phase of the radio signal.

4. The system of claim 3 wherein the periodic radio signal encodes an identifier allowing the flowable probe to be distinguished from other flowable probes.

5. The system of claim 4 wherein the flowable probes scavenge electrical energy from a wireless signal to transmit the periodic radio signal.

6. The system of claim 1 wherein the flowable probe localization circuit identifies the location of the flowable probes in three dimensions.

7. The system of claim 1 wherein the flowable probes include contact sensors for identifying whether the flowable probe is in contact with the object to provide a signal indicating that contacting.

8. A method of generating a model of an object using:
   a plurality of flowable probes having a spherical outer surface adapted to be independently Mixable into contact with a face of the object and so that they may slide over each other to move into a compacted form under the force of gravity, each of the plurality of flowable probes including a transmitter; and
   a flowable probe localization circuit having a receiver for receiving transmitted information from the transmitters of the plurality of flowable probes and identifying a plurality of locations, each associated individually with each of the flowable probes in contact with the outer surface of the object, to derive a set of location points on the outer surface of the object, the location points defined by a contact between the spherical outer surface of the probes and the outer surface of the object, to generate and output a model describing the outer surface of the object;
   a container to receive the object and to constrain the plurality of flowable probes within a volume of the container so that a plurality of the flowable probes press against the outer surface of the object under a pressure of other flowable probes to define the location points;
   wherein the flowable probe localization circuit provides antennas for receipt of signals from the flowable probes to identify the locations of the flowable probe from the signals;
   wherein the identification of the locations is based on tri-lateralization using at least one of amplitude and phase of a radio signal received or transmitted from the flowable probe; the method comprising the steps of:
   (a) placing the object in a container to receive the object and to constrain the plurality of flowable probes within a volume of the container and pouring the flowable probes into the container so that some of the flowable probes press against the outer surface of the object under a pressure of other flowable probes;
   (b) flowing the flowable probes against an outer surface of the object;
   (c) using the flowable probe localization circuit to identify the plurality of locations associated with each of the flowable probes in contact with the outer surface of the object; and
   (d) outputting a model describing the outer surface of the object identified plurality of locations.

9. The method of claim 8 further including the step of outputting from each of the each of the plurality of flowable probes a periodic radio signal and using the periodic radio signal to determine the location of each flowable probe.

10. The method of claim 9 wherein the determination of location is based on at least one of amplitude and phase of the radio signal.

11. The method of claim 10 wherein the periodic radio signal encodes an identifier allowing the flowable probe to be distinguished from other flowable probes.

12. The method of claim 11 wherein the flowable probes scavenge electrical energy from a wireless signal to transmit the periodic radio signal and including the step of interrogating the flowable probes with a radio signal from Which electrical energy can be scavenged.

13. The method of claim 8 wherein the model describes the object in three dimensions.

14. The method of claim 8 wherein the flowable probes include contact sensors for identifying whether the flowable probe is in contact with the object and including the step of providing an output signal indicating that contacting.

* * * * *